(12) United States Patent
Ochoa

(10) Patent No.: US 9,914,437 B2
(45) Date of Patent: *Mar. 13, 2018

(54) DIVERGENT INFLATION MANIFOLD ATTACHMENT

(71) Applicant: Ochoa Roadrunner Products, Inc., Alamogordo, NM (US)

(72) Inventor: Sandy Ochoa, Alamogordo, NM (US)

(73) Assignee: OCHOA ROADRUNNER PRODUCTS, INC., Alamogordo, NM (US)

(*) Notice: Subject to any disclaimer, the term of this patent is extended or adjusted under 35 U.S.C. 154(b) by 0 days.

This patent is subject to a terminal disclaimer.

(21) Appl. No.: 15/456,964

(22) Filed: Mar. 13, 2017

(65) Prior Publication Data

US 2017/0291584 A1   Oct. 12, 2017

Related U.S. Application Data

(63) Continuation of application No. 15/096,522, filed on Apr. 12, 2016, now Pat. No. 9,630,595.

(51) Int. Cl.
*B60S 5/04* (2006.01)
*B60C 25/14* (2006.01)

(52) U.S. Cl.
CPC ............ *B60S 5/043* (2013.01); *B60C 25/145* (2013.01)

(58) Field of Classification Search
CPC ............ B60S 5/04; B60S 5/043; B60S 5/046
USPC ...................... 141/38; 152/415; 157/1.1, 1.17
See application file for complete search history.

(56) References Cited

U.S. PATENT DOCUMENTS

| | | | |
|---|---|---|---|
| 3,552,469 A | * | 1/1971 | Corless ................. B60C 25/145 |
| | | | 157/1.1 |
| 3,683,991 A | | 8/1972 | Ruhland |
| 3,866,654 A | | 2/1975 | Duquesne |
| 5,072,764 A | | 12/1991 | Ochoa |
| 5,456,302 A | | 10/1995 | Demers |
| 5,509,456 A | | 4/1996 | Bonko et al. |
| 5,570,733 A | | 11/1996 | Desparois et al. |
| 5,878,801 A | | 3/1999 | Ellis |
| 5,884,659 A | | 3/1999 | Prosser et al. |
| 7,000,667 B2 | | 2/2006 | Brahler |
| 7,017,642 B2 | | 3/2006 | Brahler |
| 8,752,604 B2 | | 6/2014 | Kunau |
| 8,757,236 B2 | | 6/2014 | White |
| 9,346,331 B2 | | 5/2016 | Lundberg |
| 9,630,595 B1 | * | 4/2017 | Ochoa ..................... B60S 5/043 |

(Continued)

*Primary Examiner* — Nicolas A Arnett
(74) *Attorney, Agent, or Firm* — Dennis F. Armijo

(57) ABSTRACT

A manifold for inflating tubeless tires that efficiently directs pressurized air to a void between a tire bead and a rim edge. Manifold is fan shaped with a center face and angled side faces. Side faces have a first plurality of apertures at a predetermined centerline and the center face has a second plurality of apertures that are offset from the predetermined centerline. The offset second plurality of air flow apertures are directed to the widest void between the tire bead and rim edge while the first plurality of air flow apertures are directed to the narrow void on either side of the widest void. A two contact point stop or rest assembly is used to abut against two points on the rim edge to provide and maintain a predetermined distance between the center face and the widest void and to provide an optimum angle of the manifold for inflation.

13 Claims, 8 Drawing Sheets

(56) References Cited

U.S. PATENT DOCUMENTS

| | | |
|---|---|---|
| 2003/0178151 A1 | 9/2003 | Ritchie et al. |
| 2011/0247760 A1 | 10/2011 | White |
| 2011/0253317 A1 | 10/2011 | Kunau |
| 2011/0253318 A1 | 10/2011 | Kunau |

* cited by examiner

DIVERGENT INFLATION MANIFOLD ATTACHMENT

RELATED APPLICATIONS

This application is a continuation application of U.S. patent application Ser. No. 15/096,522 entitled "DIVERGENT INFLATION MANIFOLD ATTACHMENT", filed Apr. 12, 2016, and owned by the Applicants hereof, and hereby expressly incorporated by reference herein.

BACKGROUND OF THE INVENTION

Field of the Invention (Technical Field)

The presently claimed invention relates to tire inflation tools, and in particular, to a manifold attachment for an air inflation tire bead seater apparatus.

Background Art

There are several air inflation devices presently in the market. The devices have a tank with compressed air and a valve that releases the compressed air to a manifold with a nozzle directed to the space between a tire bead and a rim edge to partially inflate the tire and seat the beads of the tire onto the rim. Most, if not all of the prior art references require high pressures to seat the tire bead because they utilize a single outlet port or fail to direct the flow of air to the preferred area, and avoid the flow of air to areas that do not aid in seating the beads. Thus, an efficient apparatus and method for inflating a tubeless tire efficiently is required. The issues that require a solution are how the air is dispersed and directed. There are a few different styles of manifolds in the market, but they typically dump the air from the tank or inflation machine too quickly. As air is released, it expands and there is a lack of balance for the size of "barrel outlets" to gain the correct amount of air volume with the force combined.

The problem occurs in the new type and style of tire and wheel combinations. They are constantly changing with structure and shape, and the plys of a tire have increased causing the tire to be more stiff and difficult to seat. Another factor is the method of shipment of tires, which cause deformities. These issues are exacerbated with agriculture and commercial tires. The standard barrel attachment only has one port to dump the air into the tire, provides no direction for the airflow, and does not allow pressure to be built up enough to seat these difficult tires. In many cases, the operator is dangerously over filling the air tank in order to increase the volume or is using a second person with another air tank to accomplish what one person and one unit should be able to do.

U.S. Pat. No. 5,072,764 to Ochoa teaches a tapered single port nozzle for seating tire beads onto a rim.

U.S. Pat. No. 5,509,456 to Bonko, at al., teaches an arcuate shaped manifold with a plurality of air escape apertures to seat beads in large vehicle tires, such as tractor tires.

U.S. Pat. No. 5,570,733 to Desparois, at al., discloses a single aperture nozzle that is tapered in order to increase the velocity of the air exiting the nozzle.

U.S. Pat. No. 5,884,659 to Prosser, et al., is another portable tubeless tire inflating system. This device has a "V" shaped outlet port, which is flattened on the end; however, still contain ones single aperture for releasing the air.

U.S. Pat. No. 8,752,604 to Kunau discloses a jet assisted tubeless tire seating device. This device purportedly provides for a nozzle for use of smaller, easier, portably sized tanks. A jet for bringing additional air through air intake ports is taught to add to the air released from the tank. This improvement purports to provide enough air at 100 psi or less to seat a tire that is released through a "V" shaped nozzle with two (2) exit apertures.

U.S. Patent Application No. US 200310178151 A1 to Ritchie, at al., describes a cartridge type bead seater apparatus and method using the same thereof. This device uses a high-pressure cartridge that is pierced to release gas for seating a tire.

U.S. Pat. No. 5,456,302 to Demers is another single outlet manifold design.

U.S. Pat. No. 5,878,801 to Ellis describes a device for seating tubeless pneumatic tires to a wheel rim. This patent discloses a split nozzle configuration to direct pressurized air in two diverging directions.

U.S. Pat. No. 8,757,236 B2 to White describes an apparatus and method for sealing tubeless tires. A nozzle is a tube that generally follows the contour of a rim, and has several apertures on the tube for the release of high-pressure air to seat the tire.

SUMMARY OF THE INVENTION

Disclosure of the Invention

The presently claimed invention overcomes the shortcomings of the prior art by providing a fan shaped manifold with a three faced nozzle, with a first plurality of directional apertures on the side faces of the nozzle, and a second plurality of offset directional apertures on the center face portion of the nozzle. These offset apertures direct the flow of air into the void between the tire bead and the rim edge. The center face apertures, which are offset from the side face apertures, direct the airflow to the wideset part of the void, while the side face apertures direct the flow of air to the narrow voids on either side of the wide void. The offset of the center apertures provides for the direction of the airflow to that area. This configuration prevents the airflow from bouncing off the tire, the tire bead, and the rim, which does not aid in inflating the tubeless tire and accounts for wasted airflow for a tire inflating system. By using the preferred configuration of the manifold, less air pressure is required to inflate the tubeless tire and accounts for less wasted airflow. A stop is provided to abut against a wheel rim edge to provide for a preferred predetermined distance between the faces of the manifold and the wide and narrow void between the tire bead and rim edge. The stop can be a two contact stop to accommodate any sized rim or an arc shaped stop configured to match a portion of the curved shape of the wheel rim.

The preferred method of inflating a tubeless tire on a wheel includes pushing the tubeless tire against a wheel side, thus, exposing a void between the tire bead and the rim edge. Placing a stop on the manifold against a wheel rim edge provides for a predetermined distance between the manifold faces and the void, whereby the offset center face apertures are directed to the widest portion of the void and the side face apertures are directed to the narrow portions of the void on either side of the center void. Pressurized air is then released into the manifold and through the apertures in the manifold faces with pressurized air directed to the widest portion of the void via the offset center face apertures, and pressurized air is also directed to the narrow portions of the void via the side face apertures.

A primary object of the presently claimed invention is to inflate a tubeless tire or seat the beads of a tubeless tire using directed air to the void between the tire bead and a rim edge A primary advantage of the presently claimed invention is that by using directed air, less pressure is required to inflate the tubeless tire. Another advantage of the presently claimed invention is that less of the released air is wasted by traveling away from the intended location and bouncing off the tire or wheel.

Other objects, advantages and novel features, and further scope of applicability of the presently claimed invention will be set forth in part in the detailed description to follow, taken in conjunction with the accompanying drawings, and in part will become apparent to those skilled in the art upon examination of the following, or may be learned by practice of the presently claimed invention. The objects and advantages of the presently claimed invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the presently claimed invention and, together with the description, serve to explain the principles of the presently claimed invention. The drawings are only for the purpose of illustrating a preferred embodiment of the presently claimed invention and are not to be construed as limiting the presently claimed invention.

In the drawings.

DESCRIPTION OF THE PREFERRED EMBODIMENTS

Best Modes for Carrying Out the Invention

Figure 1:
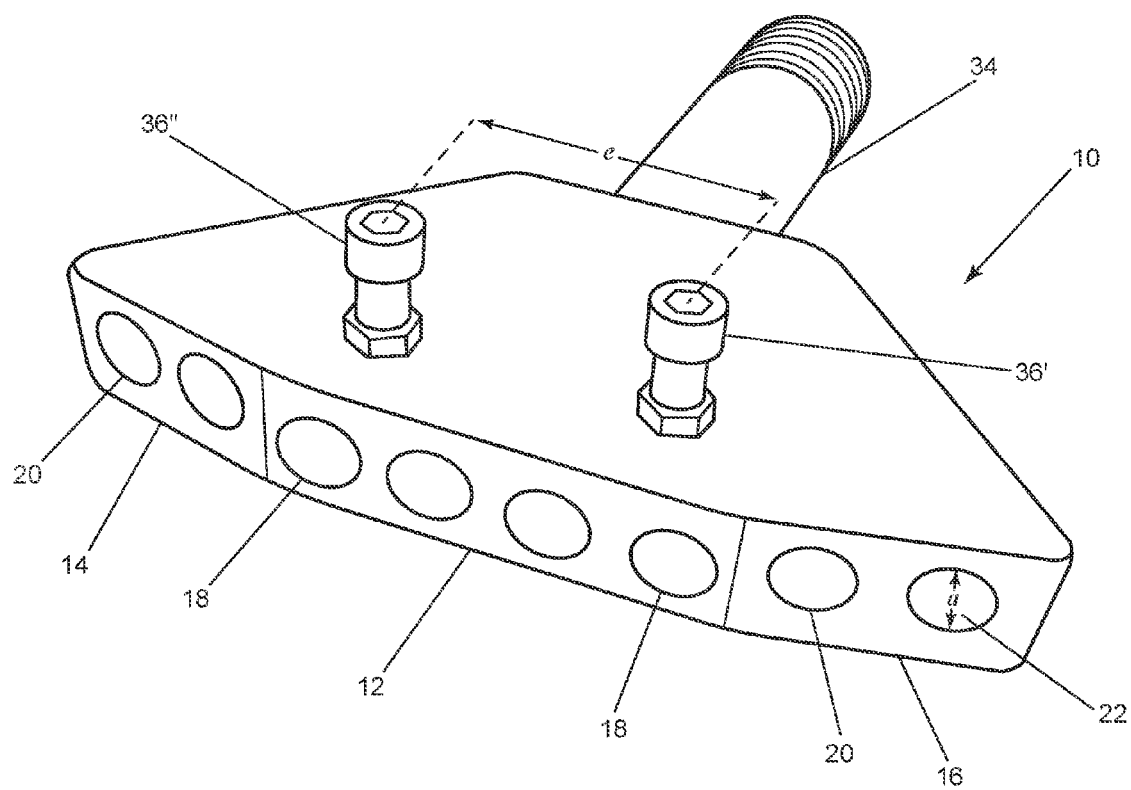
FIG. 1 is a perspective view of the preferred manifold.
Figure 2:
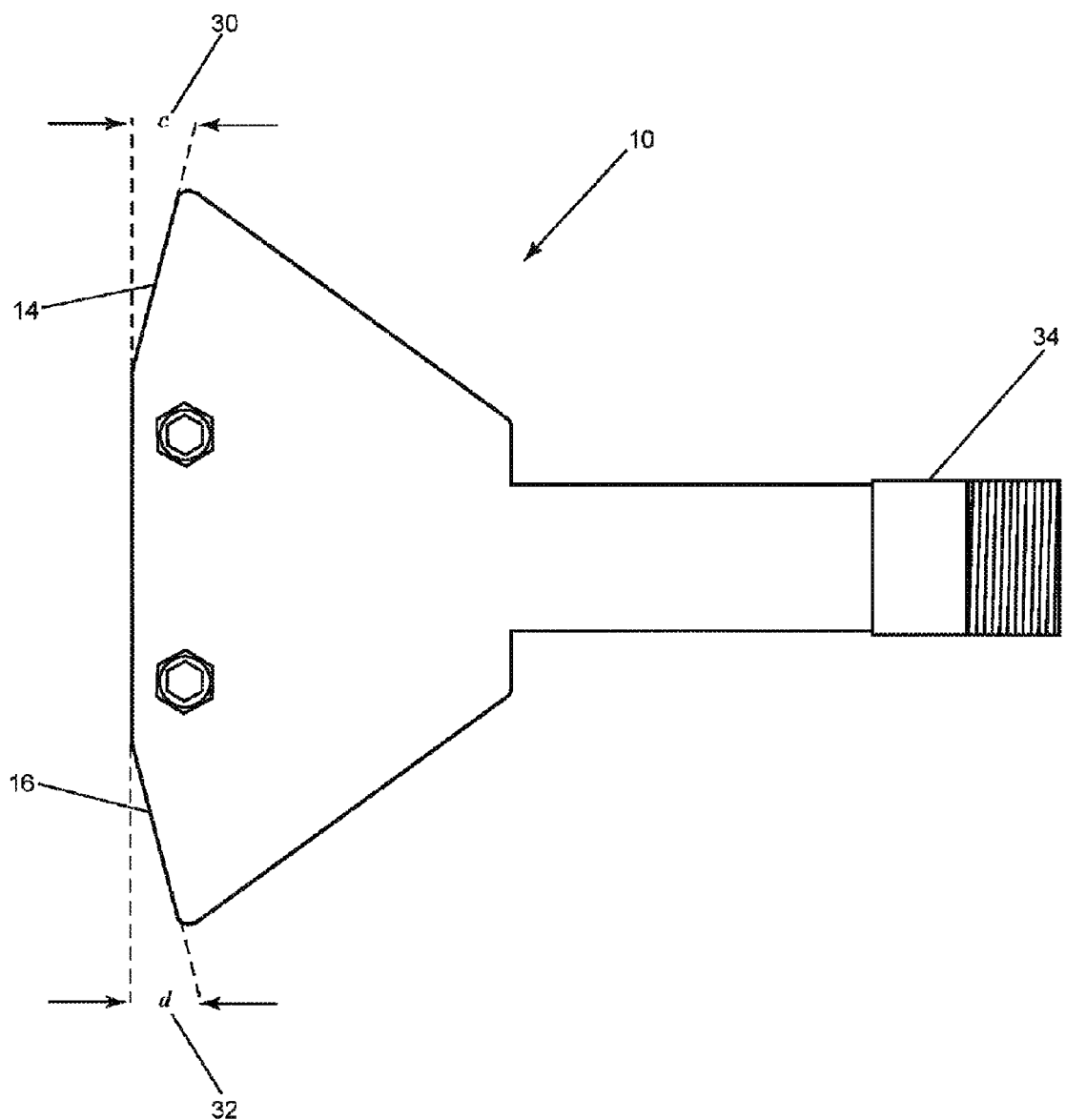
FIG. 2 is a top view of the embodiment of FIG. 1.
Figure 3:
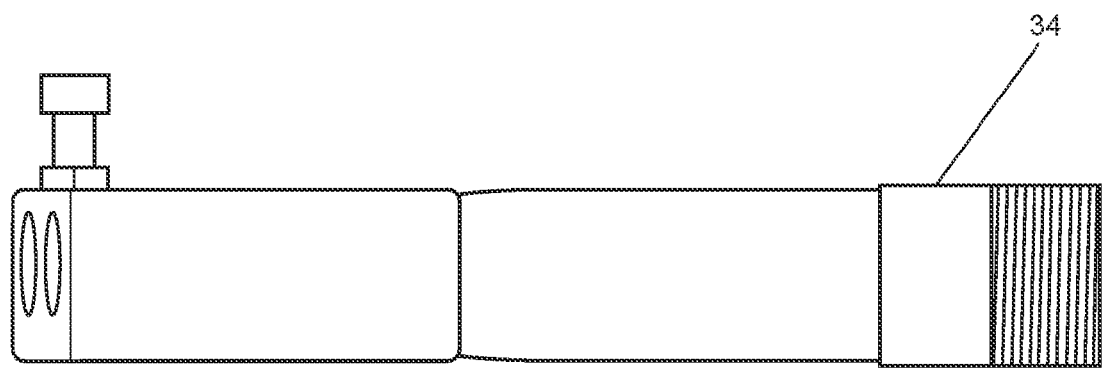
FIG. 3 is a side view of the embodiment of FIG. 1.
Figure 4:
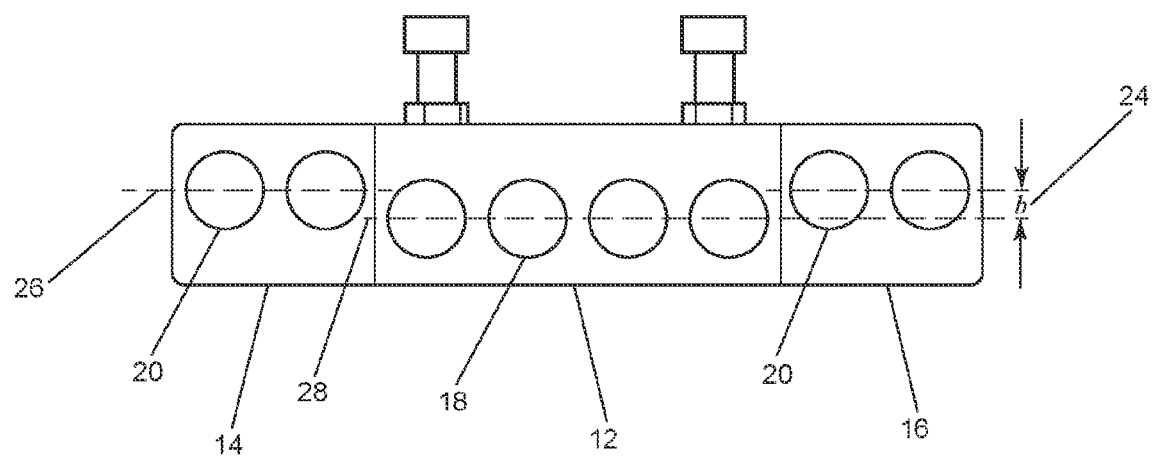
FIG. 4 is a rear view of the embodiment of FIG. 1.

The presently claimed invention provides an apparatus and method for inflating tubeless tires using air pressures that are significantly lower than existing inflation systems. This is provided by efficiently directing the release of air from the preferred manifold to the desired location. FIG. 1 is a perspective view of the preferred manifold. FIG. 2 is a top view of the embodiment of FIG. 1. FIG. 3 is a side view of the embodiment of FIG. 1, and FIG. 4 is a rear view of the embodiment of FIG. 1. As shown in FIGS. 1-4, manifold 10 is fan shaped with a center face 12, a first side face 14 and a second side face 16. As shown in FIG. 2, first side face 14 is angled from center face 12 at angle c 30 and second side face 16 is angled from center face 12 at angle d 32. The preferred angles c 30 and d 32 can be from fifteen degrees (15°) to thirty degrees (30°) from the center face line, with a preferred angle of twenty degrees (20°). Center face 12 has a plurality of center face apertures 18. First side face 14 and second side face 18 have a plurality of side face apertures 20. Although center face apertures 18 and side face apertures 20 in the shown embodiment are the same diameter a 22, this paper specifically includes apertures of different diameters on the same face or similar diameters on different faces. The preferred diameter a 22 is one-half inch (½"); however, a range from one-quarter inch (¼") to three-quarter inch (¾") can be used. The diameter of the apertures can be optimized for different sized wheel assemblies and types of tires. In addition, side face apertures 20 can be drilled at an angle to optimally direct the air flow. (Not shown). As shown more clearly in FIG. 5, center face apertures 18 are offset from side face apertures 20 by distance b 24 from a centerline of side face apertures 26 and center face apertures 28. The preferred offset is one-quarter inch (¼"); however, a range of offsets from one-eight inch (⅛") to one-half inch (½") can be used depending on the wheel assembly size and the type of tire being inflated.

Figure 5:
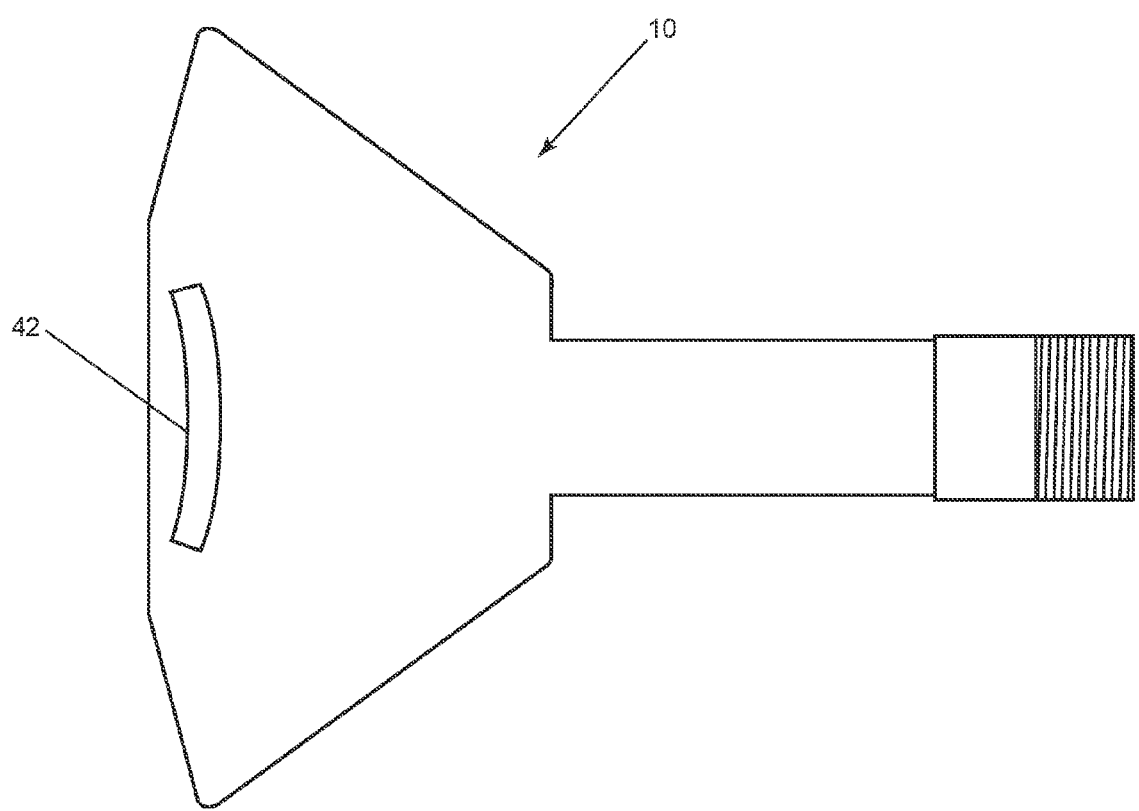
FIG. 5 is a top view of a manifold showing the alternative arc shaped stop.

The preferred manifold 10 has an inlet port 34 for insertion of the pressurized air and can be configured to accept any type of inflation tank or the like. Stops are provided to keep the manifold at a predetermined distance 40 from the void between the tire bead and rim edge. FIGS. 1-4 show a two contact point stop comprising two set points 36' and 36" that are set apart by distance e 38. Two set points 36' and 36" provide two contact points to abut against a rim edge to assure predetermined distance 40 is maintained. The two contact point stop or rest point system is preferred because the two points of rim edge in contact with set points 36' and 36" provide for a foolproof system. An alternative stop is shown in FIG. 5. Arc shaped stop 42 is configured to correspond to the shape of the rim edge, whereby arc shaped stop is abutted against the rim edge to provide predetermined distance 40.

Figure 6:
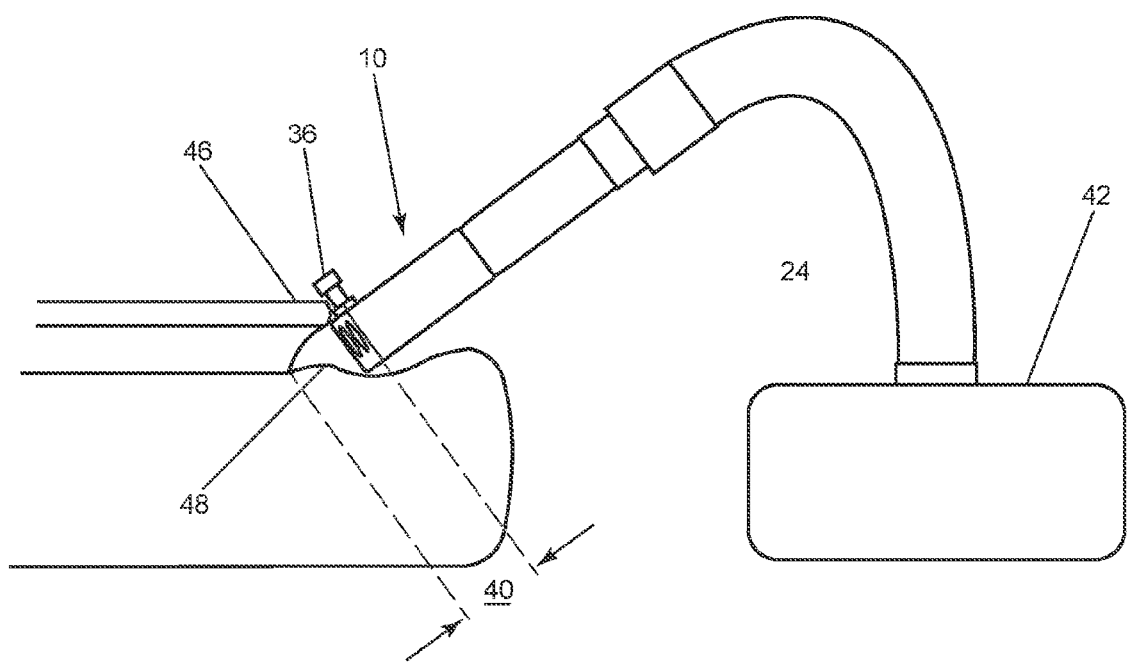
FIG. 6 shows the entire tubeless tire inflating system.
Figure 7:
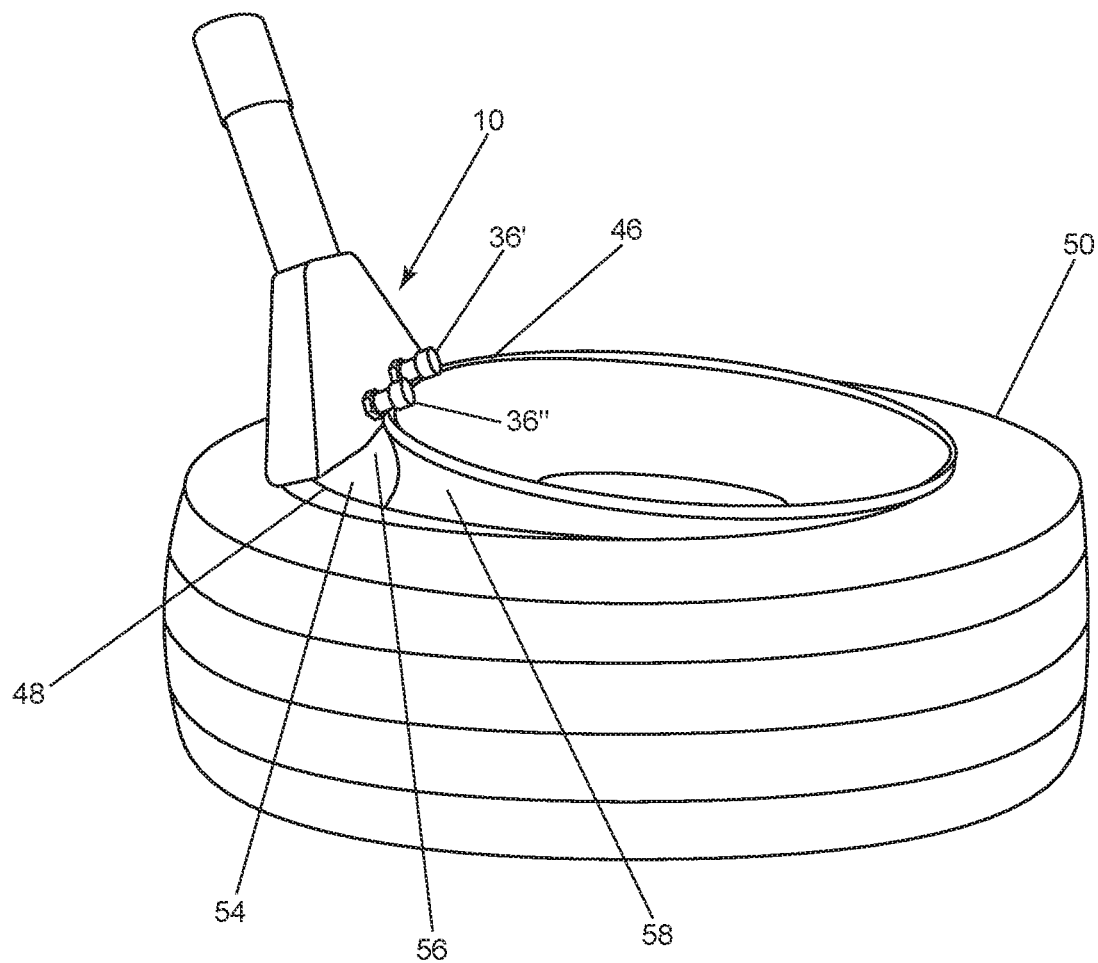
FIG. 7 shows the placement of the manifold on a wheel assembly for inflation.
Figure 8:
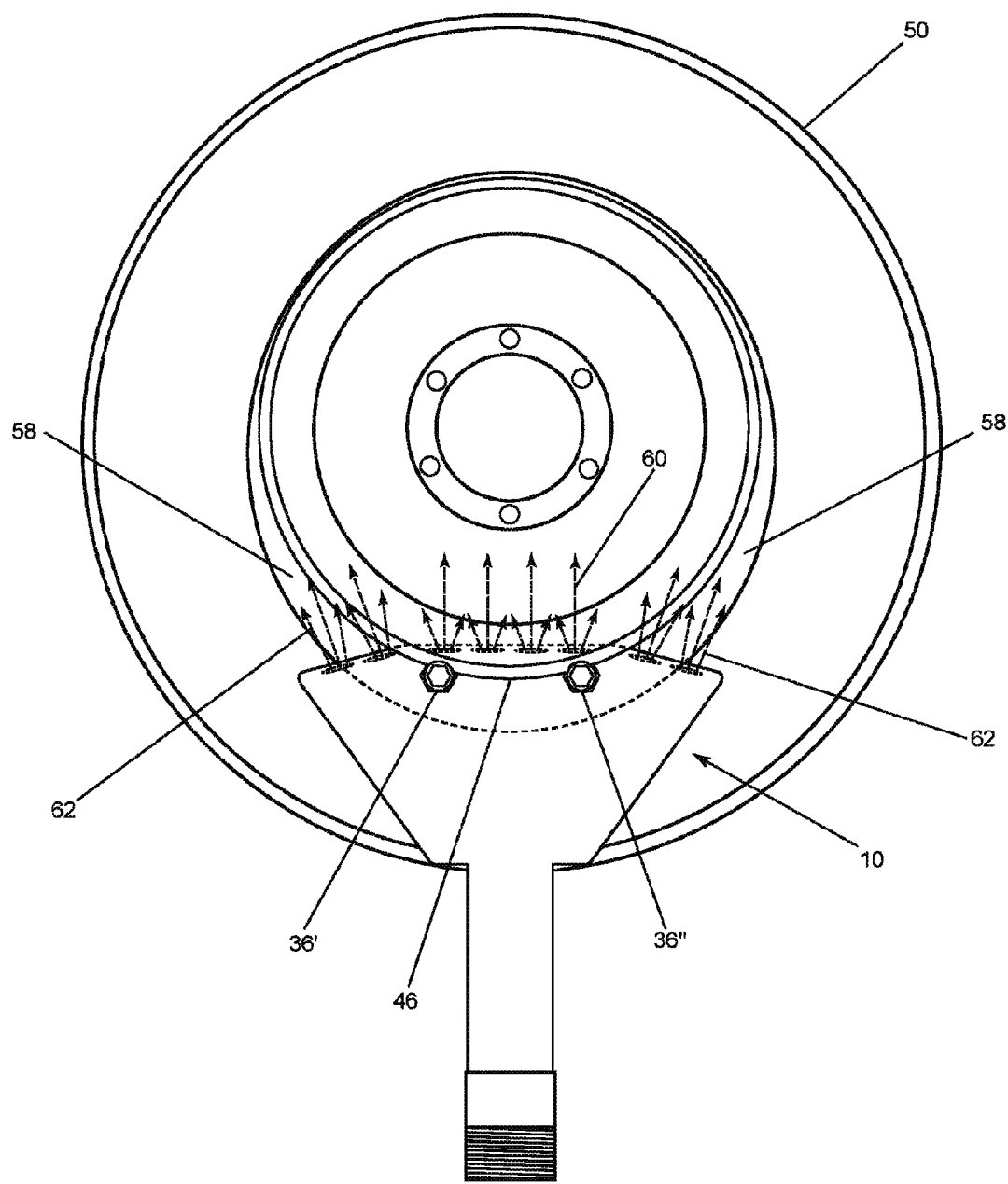
FIG. 8 illustrates the flow of pressurized air into a wheel assembly.

FIGS. 6-8 show the preferred method for inflating a tubeless tire on a wheel rim. FIG. 6 shows the entire tubeless tire inflating system. FIG. 7 shows the placement of the manifold on a wheel assembly for inflation. FIG. 8 illustrates the flow of pressurized air into a wheel assembly. A typical inflation system is shown in FIG. 6 where pressurized tank 42 is affixed to manifold 10 via tubing 44, or the like. A valve or switch (not shown) triggers the release of the pressurized air through tubing 44 and to manifold 10. Two set points 36 are abutted against rim edge 46, providing predetermined distance 40 between rim edge 46, and tire bead 48. FIG. 7 more clearly shows the proper placement of manifold 10 prior to inflation of tire 50. Rim 52 is forced against one side of tire 50 exposing void 54 between tire bead 48 and rim edge 46. Manifold 10 is properly placed by using set points 36' and 36" or stops to abut against two points on rim edge 46. This maneuver essentially centers the rim edges between set points 36' and 36", or stops and prevents movement of manifold 10 from this position when properly set. This placement provides for and maintains predetermined distance 40, of FIG. 6. Predetermined distance 40 can be between one-half inch (½") to one and one-fourth inch (1½") depending on the wheel type, size, and design. In addition, manifold 10 is maneuvered so that center face 12 is directed to widest portion of void 56. Due to the configuration of manifold 10, the placement provides for and maintains side faces 14 and 16 to be directed towards narrow portions of void 58 on either side of wide portion of void 56. Rest pieces or set points 36' and 36" are set back from the end of manifold faces to assist in pressing down on the bead and sidewall of the tire by manifold 10 to increase the size of void 56 and narrow void 58. This allows for void 54 to efficiently enter into the tire. Different rim and wheel combinations can use this system and method for inflation. Methods used now include inserting bars and blocks to open the gap between the tire and rim, are unsafe, and can hinder a true seat of the bead. The configuration of the manifold also provides for the manifold to push out of the area safely by the tire bead when the tire seats.

Set points 36' and 36" or rest pieces are also positioned to keep manifold 10 at an angle of ninety degrees (90°) to void 56, which removes operator error in using and inserting manifold 10. This maximizes the air flow and avoids angling manifold 10 to the left or right when a single rest piece is used.

FIG. 8 shows center airflow 60 from the manifold center face apertures 18 into wide portion of void 56 and side airflow 62 from side face apertures 20 into narrow portions of void 58. It is well known that air exiting apertures 18, 20 expand as shown, thus, by maintaining predetermined distance 40, providing for offset center face apertures 18 to essentially center flow of air 60 to widest portion of void 56 and using angled side face apertures 20 to essentially center flow of air 62 to the narrow portions of void 58, a majority of the pressurized air is directed into the void and little air is misdirected and wasted.

The divergent design allows for a larger spread of air without losing the force and volume. The presently claimed invention has offset ports 18 for use with multiple styles of rim and tire combinations. Some are tighter against the rim and some are very low. The manifold is designed to work with significantly lower amounts of pressure and increases the force when the air expands. It also directs the air in a streamline manner because air follows the path of least resistance. The more surfaces the air particles have to bounce off, the less force is provided to the required area. The ports in the middle section 18 are more direct and in a lower position to wedge in between the rim and bead of the tire. The left and right sections of ports 20 are slightly elevated to wrap around the wheel and enter into the cavity more efficiently. This results in more tires being inflated on the first try with lower pressure using a single inflation unit.

Although the presently claimed invention has been described in detail with particular reference to these preferred embodiments, other embodiments can achieve the same results. Variations and modifications of the presently claimed invention will be obvious to those skilled in the art and it is intended to cover in all such modifications and equivalents. The entire disclosures of all references, applications, patents, and publications cited above, are hereby incorporated by reference.

What is claimed is:

1. A manifold for inflating tubeless tires on a wheel comprising:
   a fan shaped housing comprising three faces;
   a first and second face on either side of a center face; and
   a plurality of apertures disposed on the first, second and center face, wherein the center face, the first and second face, and the plurality of apertures are configured to divergently direct pressurized air.

2. The manifold of claim 1 further comprising a two contact stop for abutting the manifold against a rim edge.

3. The manifold of claim 1 further comprising an arc shaped stop for abutting the manifold against a rim edge.

4. The manifold of claim 1 wherein the plurality of apertures comprise a predetermined diameter a.

5. The manifold of claim 4 wherein the predetermined diameter a comprises a diameter between one quarter inch (¼") and three quarter inch (¾").

6. The manifold of claim 1 wherein the first face comprises an angle c from the center face and the second face comprises an angle d from the center face.

7. A method of inflating a tubeless tire on a wheel, the method comprising the steps of:
   providing a fan shaped manifold with three faces, a first and second face on either side of a center face, a plurality of apertures disposed on the first, second and center face, wherein the center face, the first and second face, and the plurality of apertures are configured to divergently direct pressurized air;
   abutting a stop on the fan shaped manifold against a rim edge of the wheel;
   aiming the plurality of apertures towards a gap between a bead of the tubeless tire and the rim edge; and
   triggering a flow of the pressurized air through the plurality of apertures.

8. The method of claim 7 wherein the step of aiming comprises aiming the plurality of apertures towards at least one narrow gap between the bead of the tubeless tire and the rim edge.

9. The method of claim 7 wherein the step of abutting a stop comprises abutting a first set point against a first part of the rim edge and a second set point against a second part of the rim edge.

10. The method of claim 7 further comprising pushing down on the fan shaped manifold to compress the tire bead and widen the gap between the tire bead and rim edge.

11. The method of claim 7 wherein the step of abutting a stop comprises providing a predetermined distance between the center face and the gap between the bead of the tubeless tire and the rim edge.

12. The method of claim 7 wherein the step of providing a fan shaped manifold comprises the first face comprising an angle c from the center face and the second face comprising an angle d from the center face.

13. The method of claim 7 further comprising the step of pushing the manifold away from the rim edge and the bead of the tubeless tire when the tubeless tire inflates.

* * * * *